INVENTORS
Robert A. Hesse &
Saverio Minervini

George A. Grove
ATTORNEY

United States Patent Office 3,501,633
Patented Mar. 17, 1970

3,501,633
X-RAY DIFFRACTION METHOD OF DETERMINING CARBON CONTENT IN STEEL
Robert A. Hesse, Sandusky, Ohio, and Saverio Minervini, Fort Lee, N.J., assignors to General Motors Corporation, Detroit, Mich., a corporation of Delaware
Filed Mar. 15, 1968, Ser. No. 713,372
Int. Cl. G01n 23/20
U.S. Cl. 250—51.5         5 Claims

ABSTRACT OF THE DISCLOSURE

X-ray diffraction analysis may be employed to rapidly determine the carbon content at a surface of a hardened steel specimen without destroying the part. In a preferred embodiment of the invention, a specimen is subjected to monochromatic X-radiation such that reflected radiation is obtained from certain preferred families of lattice planes selected from those planes whose spacing is a function of the carbon content of the steel. Since the angle of reflection of the radiation is a function of the spacing of the irradiated planes, the value of the angle at which reflected radiation of peak intensity is detected may be correlated with the carbon content of the specimen.

---

This invention relates to the analysis of interstitial carbon in steel and more particularly it relates to a method of employing X-ray diffraction techniques to determine the amount of carbon in solid solution in hardened steel.

In the manufacture of hard, durable steel articles there frequently is a need to measure the carbon content of the steel surface for purposes of quality control. Many of the physical properties of the surface such as hardness, strength, and wear resistance are, at least in part, related to interstitial carbon content. Heretofore, the principal method of measuring the carbon content of such a surface has been to remove a portion of the surface by machining and subject the removed particles to chemical analysis. Conventionally, this analysis involves combustion of the carbon in the particles to form carbon dioxide, absorbing the carbon dioxide into a standard caustic solution, and titrating the caustic solution with acid to determine the amount of carbon dioxide absorbed. It is apparent that the above-described process is time consuming and requires mutilation of the surface being tested. If the steel article to be tested is one of many being produced by large volume manufacturing processes subject to variations in critical parameters, large numbers of defective pieces can be made before a defect is discovered by prior art analytical procedures. Obviously, therefore, it would be highly desirable to have a rapid method of carbon analysis of steel specimens so that a more timely check on production operations can be obtained. It would also be advantageous to have an analytical procedure which does not damage the part being tested.

It is an object of the present invention to provide a method of employing X-radiation to rapidly determine the interstitial carbon content of a hardened steel specimen.

It is another object of the present invention to provide an X-ray diffraction technique for measuring the amount of carbon in solid solution in a portion of a steel sample having a microstructure of martensite, or of martensite and retained austenite.

It is a more specific object of the present invention to provide a method of subjecting a hardened steel specimen to monochromatic X-radiation such that the X-rays are reflected from certain preferred families of planes of iron atoms, the angle of reflection being a function of the interstitial carbon content of the irradiated surface.

In accordance with a preferred embodiment of the subject invention, these and other objects are accomplished by subjecting the surface of a hardened steel specimen to monochromatic X-radiation having a suitable wavelength (e.g., approximately 2.29 angstroms) and positioning the specimen with respect to said radiation so that reflected radiation is obtained from either those families of parallel planes of iron atoms in the martensite phase which are characterized by Miller indices of 200, or those families of parallel planes of iron atoms in the retained austenite phase which are characterized by Miller indices of 220. The spacing between these planes of iron atoms is a function of the concentration of dissolved carbon. Moreover, as we have discovered, minute differences in the spacing of these planes due to changes in carbon content are readily detectable by an observable proportionate change in the angle at which reflected radiation of peak intensity is found. Once the values of the angles of peak reflection intensity have been measured from samples having varying, but known, carbon contents empoying X-radiation of specific wavelength, the concentration of interstitial carbon is a hardened steel sample of unknown carbon content may be obtained by comparing its measured angle of peak intensity with the compilation of previously obtained values. In other words, once a graph or compilation of the angular position of the peak intensity of reflected radiation has been obtained from samples of known carbon contents, a carbon analysis can then be quickly and easily obtained simply by measuring the position of peak intensity of reflection from one of the two above-identified families of lattice planes or their equivalent. and then referring to the graph. In general, we have found that our method can be employed to measure interstitial carbon contents over a range of from about 0.5 to 1.5% by weight.

Other objects and advantages of the invention will be made more clear from a detailed description thereof, reference being had to the attached drawings in which.

Figure 1:
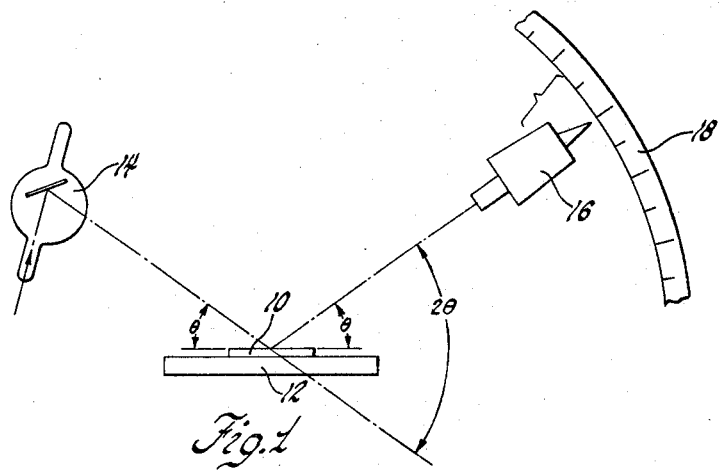
FIGURE 1 is a schematic representation of an arrangement of an X-ray source, hardened steel specimen and reflected X-ray detector suitable for the practice of the invention.

Before proceeding with a detailed description of the invention, it may be helpful to first briefly summarize some of the basic principles of X-ray diffraction and crystallography. As discovered by Wilhelm Roentgen, when high speed electrons impinge upon metal electrodes, penetrating radiation is emitted which has been called X-rays. X-rays are similar in nature to light but have much shorter wavelengths and higher frequencies. Subsequently, it was recognized that the wavelength of some X-radiation was of the order of magnitude of the distances between atoms or molecules in crystalline materials. Accordingly, diffraction patterns were obtained when X-rays of appropriate wavelength were directed against a suitable crystal. W. H. and W. L. Bragg devised a method of measuring the distance between families of parallel planes of atoms in a crystalline solid by reflecting X-rays from them. As may be found in many texts on the subject of X-ray crystallography, the Bragg relationship between the wavelength of incident radiation, the angle of reflection and the distance between the parallel planes of atoms is:

$$n\lambda = 2d \sin \theta$$

where $\lambda$ is the wavelength of the incident radiation, $n$ is an integer, $d$ is the spacing between parallel planes of atoms and $\theta$ is the angle at which the radiation is reflected from the lattice plane.

Crystals are formed of atoms or molecules arranged in a relatively orderly geometric configuration. While few crystals are perfectly developed, this orderly structure may nevertheless be observed. Even before X-ray diffraction techniques were developed the basic crystal structures had been identified and named, as for example, cubic, tetragonal, ortho rhombic, etc. Furthermore, systems were developed for defining the orientation of the crystal faces. A widely used classification system is that of W. H. Miller who proposed the use of reciprocal intercepts ($h$, $k$ and $l$). By use of the reciprocals of the values of the intercepts of a plane with arbitrarily imposed crystal axes, it is possible to conveniently characterize the orientation of the plane or face with integers of small value or zero. Since it is possible to reflect X-rays from atoms in many different lattice planes, Miller intercepts or indices are useful in specifying the plane(s) of interest. A combination of these principles of crystallography and X-rays are employed in the practice of our invention.

Although carbon atoms are considerably smaller than iron atoms the arrangement of iron atoms is distorted when carbon is dissolved therein. In general, the more carbon that is added the greater the distortion. In accordance with the subject invention, hardened steel specimens containing principally a martensite phase, a retained austenite phase, and a small amount of carbide phase may be analyzed. However, the carbides are of no interest as far as an analysis of interstitial carbon is concerned. Austenite is a solid solution of carbon in iron which crystallizes as a face-centered cube. At room temperature it is meta-stable and usually characterized, when at that temperature, as retained austenite. Martensite is also a meta-stable structure. It is an interstitial supersaturated solid solution of carbon in iron having a body-centered tetragonal lattice. A solid containing a mixture of body-centered and face-centered crystal structures presents a very large number of families of planes from which X-radiation can be reflected. In fact, a detailed X-ray analysis of hardened steels to determine the carbon content, and variations in carbon content, in the surface thereof would be a laborious task and one which would not readily be fruitful. This is because relatively small changes in the spacing of most families of planes results in too small a change in the angle of reflection to be detected and readily correlated with changes in interstitial carbon content. However, in the case of hardened steel, we have noted one set of planes in the martensite phase and one in the austenite phase whose planar spacing is directly proportional to the carbon content and in which sets minute changes in spacing may readily be detected by X-ray diffraction. In the case of martensite, this family of planes is characterized by the Miller indices 200 and in the case of the retained austenite phase the family of planes is characterized as 220. All families of planes of the respective crystals are not suitable for the purpose of this invention. Nevertheless, there may be planes, other than the two sets defined above, which may also be used for the purposes of the invention, the criteria being that the distance between the planes be a function of the carbon content of the steel and that the angular position of the peak value of the reflected radiation shift in a detectable manner with channels in carbon content.

In accordance with the invention, a hardened steel specimen having a microstructure consisting substantially of martensite, or martensite and retained austenite, in the region of interest is taken for analysis. If there is any doubt of the microstructure of the specimen, it should be heated above its critical temperature until austenitized and subsequently quenched to produce the required microstructure, at least in the surface portion thereof. Preferably the specimen is cleaned of extraneous matter and electrolytically etched at the surface of interest for about five seconds in an aqueous solution of sulfuric acid, phosphoric acid and chromic acid.

Referring now to FIGURE 1, the specimen 10 is positioned in the analyzing stage 12 of a suitable X-ray generating instrument which is shown only in schematic form in the drawing. Such instruments are well known and commercially available and therefore will not be described in detail here. In general, however, the source of X-rays 14 is arranged so that suitable radiation may be directed against the surface of the specimen. Reflected radiation is detected by a suitable X-ray sensitive device 16 such as a Geiger-Müller tube, proportional counter, scintillation counter, ionization chamber or the like movably mounted on a scale 18 so that the angular position of the peak intensity of the reflected radiation may be determined. Electric pulses produced by the detector 16 in response to incoming radiation are counted by appropriate electronic instruments (not shown) coupled to the detector and may be displayed on a suitable indicating device such as a strip chart recorder or display panel.

We have preferred to use X-radiation produced by impinging high energy electrons against a chromium target. This monochromatic radiation of approximately 2.29 angstroms wavelength is particularly suitable for use in accordance with our analysis of steel samples. However, it will be appreciated by those skilled in the art that radiation of other suitable wavelengths may be employed so long as diffraction patterns are obtained with hardened steel.

As shown in FIGURE 1, $\theta$ is the angle of incidence of the X-radiation with respect to the surface of the specimen. Since the hardened steel specimen is a fine-grained polycrystalline material wherein the many individual crystals of austenite and martensite are randomly oriented, $\theta$ will also be the angle of incidence of the X-ray beam with respect to at least some martensite 200 or austenite 220 planes. The angle of the reflected radiation from these planes will also be $\theta$, the reflected radiation from other planes for the most part being destroyed by interference phenomena. It will also be noted from FIGURE 1 that the angle of reflected radiation has a value of $2\theta$ with respect to the incident radiation. Most instruments employed in X-ray analysis are arranged and constructed to measure this latter angle of the value of $2\theta$. It is this angle that will be referred to henceforth in the specification. However, it will be appreciated that the value of the angle of $\theta$, or the value of $\sin \theta$ or other suitable parameters could equally well be employed in our method.

Figure 3:
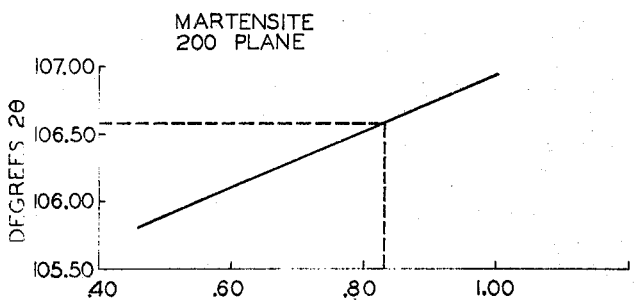
FIGURE 3 is a plot of the angular position of reflected X-rays of peak intensity vs. carbon content for the martensite 200 plane.

As shown in FIGURE 3, for low alloy steels containing between about 0.5–0.95% carbon, the martensite 200 family of planes may be employed in accordance with our carbon analysis. The angular position ($2\theta$) of the peak intensity of reflected radiation of X-rays ($\lambda=2.29$ angstroms) will be about 105.50° to 107.00° from the incident radiation. This correlation of carbon content vs. $2\theta$ values was obtained by subjecting hardened steel alloys to chromium X-rays and locating the angular position of peak intensity of the reflected radiation in the above range from the martensite 200 plane. The tabulated carbon composition is interstitial carbon and does not include that which may be present in the form of metal carbides.

Figure 2:
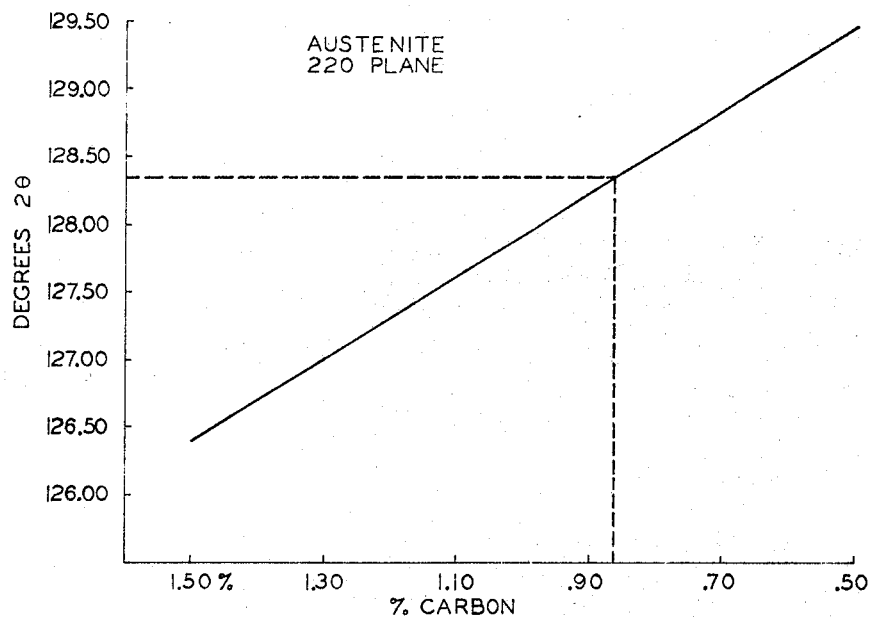
FIGURE 2 is a plot of the angular position of reflected X-rays of peak intensity vs. carbon content for the austenite 220 plane.

FIGURE 2 shows a similar correlation of carbon content with the angular position of peak reflected radiation from the austenite 220 plane. In general, this correlation is useful for an interstitial carbon content range of about 0.65–1.5% by weight. As above this correlation was prepared by subjecting specimens of known carbon content to X-radiation and measuring angular position of the peak reflected intensity. In this instance the value of $2\theta$ for the carbon contents of interest was between 126.00° and 129.50°.

It is to be understood that the absolute values of the angle of reflection are a function of the wavelength of the X-radiation as well as of the carbon content, and the correlations of FIGURES 2 and 3 are, therefore, useful only with chromium X-rays. Other correlations must be prepared if X-rays of a different wavelength are employed. The graphs of FIGURES 2 and 3 of the drawings are intended to be illustrative of the relationship between the carbon content and the 2θ and are not intended to have the accuracy required for use in actual analytical experiments.

A specific example of the practice of our invention will more fully illustrate the principles and advantages thereof:

A determination of the carbon content was required on a carburized and quenched sample of what was originally an SAE 4118 steel. The steel component had been gas carburized at about 1700–1750° F., subsequently cooled to about 1550° F. and quenched in oil. Prior to the heat treatment the steel contained by weight 0.76% manganese, 0.12% nickel, 0.47% chromium, 0.12% molybdenum, 0.27% silicon, 0.20% carbon and the balance iron. It was desired to determine the interstitial carbon content at the surface of the carburized specimen. The specimen was mounted on the analyzing stage of an X-ray generator and subjected to chromium X-rays of approximately 2.29 angstroms wavelength. Reflected X-radiation of peak intensity from the austenite 220 planes was located at a 2θ angle of 128.35°. It was found by comparing this value with a correlation such as depicted in FIGURE 2 that the carbon content at the surface was approximately 0.86% by weight.

For purposes of comparison, the X-radiation reflected from the martensite 200 planes was detected and observed to be of peak intensity at a 2θ angle of 106.60°. Once again by comparing the measured angle with a correlation (see FIGURE 3) of like values obtained from samples of known carbon content, the carbon content in this technique was observed to be 0.83% by weight. This latter value confirms the value obtained above.

Small amounts of alloying elements such as chromium, nickel and other strengthening alloys have no effect on our method so long as the basic crystal structure of the martensite or retained austenite is not altered. The invention is not intended for determining the amount of carbon that is present in metal carbides, but is to be used in the determination of interstitial carbon.

Since our analysis method involves the detection of X-rays reflected from planes of atoms near the surface of the sample, it will be appreciated that the resulting carbon value is applicable principally to the surface layer of the material. If the specimen is known to be homogeneous the analysis of the surface gives a reliable picture of the whole specimen. However, in cases where the specimen has been carburized and quenched the carbon content at the irradiated surface is different from the carbon content of the substrate.

Since our analytical procedures makes use of specific families of planes in the martensite or retained austenite phases it is preferred that the hardened steel specimen contain substantially no ferrite or pearlite.

While our invention has been described in the terms of a few specific embodiments it will be appreciated that other forms might readily be adapted by those skilled in the art and therefore the scope of the invention will be limited only by the following claims.

We claim:

1. A method of determining the carbon content at a surface of a hardened steel specimen having a microstructure of principally martensite and retained austenite comprising: subjecting the surface of said specimen to monochromatic X-radiation, positioning said surface with respect to said radiation such that reflected radiation is obtained from atoms lying in a family of parallel planes of atoms which are separated by a distance proportional to the carbon content of the specimen and which are positioned so as to affect detectable changes in the angle of reflection of said radiation when the carbon content of hardened steel specimens change in the range of about 0.5–1.5% by weight carbon, measuring the angular position at which said reflected radiation is of peak intensity and comparing the value of said measured angle with a compilation of like values obtained in a like manner from surfaces of known carbon content to determine the carbon content of said steel specimen.

2. A method of determining the carbon content at a surface of a steel specimen having a microstructure of principally martensite and retained austenite comprising: subjecting said surface to monochromatic X-radiation, positioning said surface with respect to said X-radiation until reflected radiation is detected from those families of planes of atoms in said martensite characterized by Miller indices of 200 or the equivalent thereof, measuring the angle at which the peak intensity of said reflected radiation is obtained and comparing the value of said measured angle with a compilation of like values obtained in a like manner from surfaces of known carbon content to determine the carbon content in said steel specimen.

3. A method of determining the carbon content at a surface of a steel specimen having a microstructure of principally martensite and retained austenite comprising: subjecting said surface to X-radiation having a wavelength of about 2.29 angstroms, positioning said surface with respect to said X-radiation until reflected radiation is detected from those families of planes of atoms in said martensite characterized by Miller indices of 200 or the equivalent thereof, measuring the angle at which the peak intensity of said reflected radiation is obtained and comparing the value of said measured angle with a compilation of like values obtained in a like manner from surfaces of known carbon content in the range of about 0.5–0.95% by weight carbon to determine the carbon content in said steel specimen.

4. A method of determining the carbon content at a surface of a steel specimen having a microstructure of principally martensite and retained austenite comprising: subjecting said surface to monochromatic X-radiation, positioning said surface with respect to said radiation until reflected radiation is detected from those families of planes of atoms in said retained austenite characterized by Miller indices of 220 or the equivalent thereof, measuring the angle at which the peak intensity of said reflected radiation is obtained and comparing the value of said measured angle with a compilation of like values obtained in a like manner from surfaces of known carbon content to determine the carbon content in said steel specimen.

5. A method of determining the carbon content at a surface of a steel specimen having a microstructure of principally martensite and retained austenite comprising: subjecting said surface to X-radiation having a wavelength of about 2.29 angstroms, positioning said surface with respect to said radiation until reflected radiation is detected from those families of planes of atoms in said retained austenite characterized by Miller indices of 220 or the equivalent thereof, measuring the angle at which the peak intensity of said reflected radiation is obtained and comparing the value of said measured angle with a compilation of like values obtained in a like manner from surfaces of known carbon content in the range of about 0.65% to about 1.5% by weight carbon to determine the carbon content in said steel specimen.

References Cited

UNITED STATES PATENTS

| | | | |
|---|---|---|---|
| 2,318,667 | 5/1943 | Bruce | 250—51.5 X |
| 3,402,291 | 9/1968 | Weinman | 250—51.5 |

ARCHIE R. BORCHELT, Primary Examiner

A. L. BIRCH, Assistant Examiner